United States Patent Office 3,185,267
Patented May 25, 1965

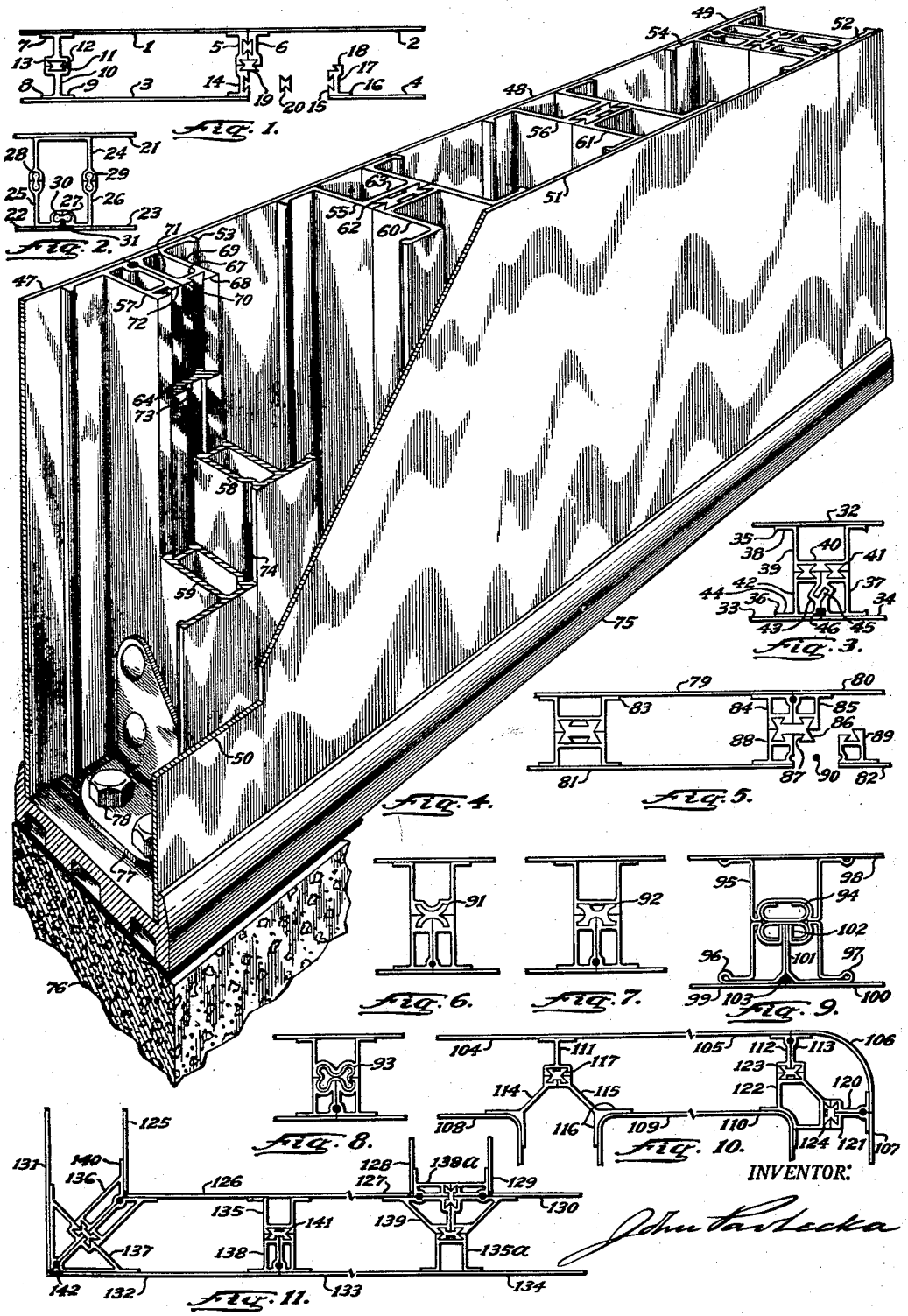

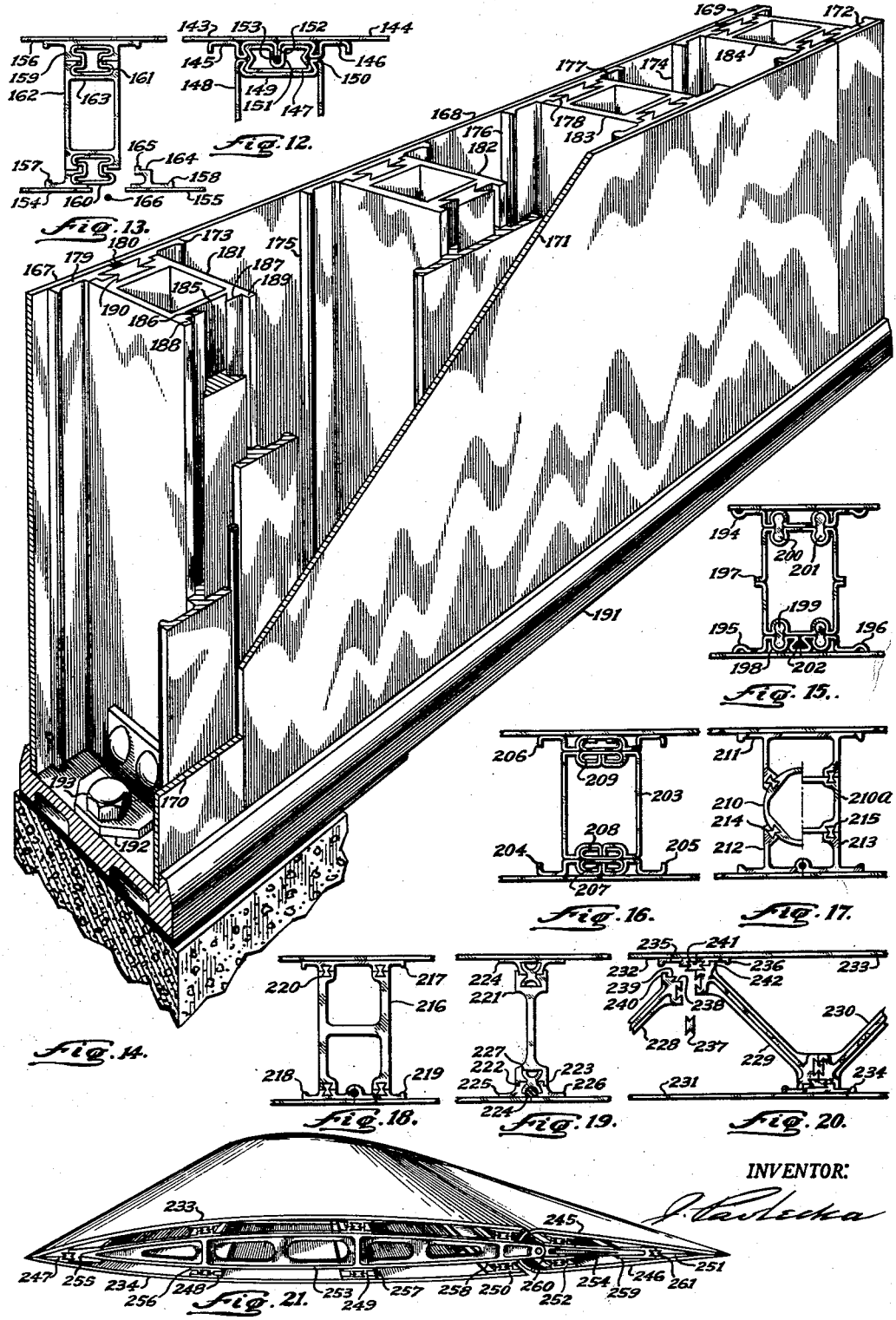

3,185,267
INTERLOCKED PANEL STRUCTURE
John Pavlecka, 8797 Capital Ave., Oak Park, Mich.
Filed July 26, 1952, Ser. No. 301,010
36 Claims. (Cl. 189—34)

This invention relates to a novel type of structure for walls and floors of buildings, partitions, decks, van and bus bodies, bill boards, aircraft wings, etc.

One object realized through my invention is a structure in which individual panels or panel units, complete in every way, are assembled or erected readily and can subsequently be disassembled for inspection, repair, or transfer into spaced rows, with or without interjacent stress members, by telescoping easily handling keys in the form of dual-tenon splines inbetween them.

A further object resides in a structure, normally too narrow for accessibility of its interior, from whose fabrication and assembly all such fastening parts as rivets and screws are eliminated with the result that not only time and labor are saved but a flawless exterior is obtained such as is requisite in all structures for appearance and in airfoil ones for low air resistance.

Another object is a structure marked by a high strength-to-weight ratio because of the use of interior joining members of a large section modulus which, together with interlocking splines, function most effectively as stress members for all loads.

Yet another object is a structure wherein panels of the greatest width available are usable and the number of seams reduced thereby, and the seams extent are tightly closed and sealed against elements.

An object of particular importance is a structure for either single-thickness walls or for hollow walls and bodies, the principal components of which are individual panel units, or panel units and associated stress members, which are manufactured from sheets or plates and extruded or rolled shapes, and because of full accessibility, joining processes such as resistance welding and adhesive bonding can be used to the fullest extend, thereby reducing manual fabrication largely to manufacturing processes, and doing away with "blind" as well as open riveting in place of small pieces of "skin" in aircraft wings.

Referring first to all the figures in the drawings, which form an integral part of this specification, the structures and structural unions represented therein are all distinguished by the same basic principles of configuration and assembly, and all include certain analogous components; in all of them at least two panels or panel units meet edge-to-edge at parting lines in a row which provides one exterior face of the structure; distanced from the inner face of this row is a number of structural members which may be either stringers on another row of panel units in a spaced apart facing relationship to the first one, or they may be individual stress members such as studs, spars, joists, beams, rafters, etc.; in most of the latter cases a second row of panel units runs also along the other ends of the stress members and provides the opposite exterior face of a hollow wall or structure. Interposed between such panel unit rows, or between one row and individual structural members associated therewith, either singly or in groups of two or more at each parting line and at intervals apart therefrom, are linear keys of a profile consisting of two wedges, dovetail tenons, bulbs, etc., siamesed at their small end, the resulting shape being known in wood joinery and in machine construction as a "spline."

The function of these splines is to effect, directly or indirectly, a lateral union of the panel units in each row with each other at their parting lines, as well as their frontal union with the panel units in an opposite row, or with individual structural members disposed at and along the parting lines and at intervals apart from them; the front unions are accomplished through the medium of wall means which form part of the panel units as auxiliary stress members, usually in the form of stringers; two such stringers extend in juxtaposition with each other on each two meeting panel units at and along the parting line thereof, and other stringers, referred to as "intermediate" ones, extend on some or on all of the panel units at intervals apart from the parting lines; the juxtaposed and the intermediate stringers reach from their panel units into opposition one type with either the same type, or with the other type, or into opposition with profile extremities on individual structural members associated with one or both panel unit rows; the opposed stringers of both types, or the stringers and the structural members, bear faces with substantially coplanar shoulders thereon, the opposite shoulders being in contiguity, i.e., in contact or near contact with each other; between such shoulders the stringers, or the stringers and the structural members, have one or more of reentrant lengthwise keyways or mortises in registry with each other; into each two keyways or mortises in registry is telescoped one spline of the aforementioned dual-tenon profile, which engages the stringers, or the stringers and the structural members slidably and interlockingly.

The engagement of each spline with the mortises is preferably as close a wedge fit as a slidable contact and manufacturing tolerances will allow, the purpose being to hold the opposed stringers, or stringers and structural members, in contiguity of their opposed shoulders and, depending upon the degree of the wedge fit obtainable, even cause them to be drawn into contiguity for a lash-free union; in any case, such stringers, or stringers and structural members, in contact or near contact with each other, will abut against each other's shoulders under strain, thereby providing a wide base on each other for effective bracing themselves against sway due to lateral loads, or against frontal loads, or against failure under columnar loads. Such stringers, or stringers and structural members, contacting or even abutting at their full width, coact with each other directly rather than through the narrowest portion of the spline or splines locking them together, and thereby function as unitary stress members in the wall or structure.

A feature of fundamental importance in the relationship of the stringers, or stringers and structural members, resides in that the juxtaposed ones at panel unit parting lines jointly constitute a full equivalent of one intermediate stringer with two coplanar corner extremities or shoulders and the same number of keyways or mortises therein, whereby such juxtaposed stringers can be oppositely alined and interlocked with either one intermediate stringer on a facing panel unit or with an individual structural member, or with two other juxtaposed stringers on two panel units in a facing row or on two proximate stress member ends. The significance of this universality of the stringers lies in that it does away with any particular relationship between the parting lines in facing panel rows, or between individual members and the parting lines in one or two panel rows associated therewith; moreover, since the panel parting lines can occur at random at any interval between two stringers on a row of panel units, the panel units can be of different widths which are a multiple of one interval.

A lateral union of two adjoining panel units is effected through the instrumentality of the juxtaposed stringers on them, and by one spline having a lateral mortise-and-tenon engagement with each one of them; or, each two juxtaposed stringers may be formed with complemental interfitting tongue-and-grove means which prevents their lateral parting; or, in cases where only one structural member, be it either a stringer or an individual member, confronts such juxtaposed stringers, they can be held in unity by making the member straddle them along their shoulders; or, as a preferred manner of applying my invention, one spline only is used to lock together two juxtaposed stringers with each other as well as with an associated member or members, such spline being grooved or mortised lengthwise in its outer faces, or in at least one of them, and the stringers being formed with tongues or tenons of their own which fit side-by-side into such a groove or mortise.

The foregoing principles of my new panel structure allow of various modifications in the innumerable embodiments to which they are applicable, as shown in the accompanying drawings and as described hereinfurther with reference thereto.

In the drawings:

FIG. 1 is an end view of a portion of a structure such as a building wall in which panel units are conjoined both in adjoining and facing relationships by means of juxtaposed and oppositely alined stringers and prismatic splines; one panel unit is shown disconnected;

FIG. 2 is the profile of a structural union of juxtaposed stringers on adjoining panel units effected by one spline, and of an intermediate stringer on a facing panel locked to each one of them by an individual spline;

FIG. 3 is another union wherein an intermediate stringer is interlocked with two juxtaposed edge stringers by two splines, the edge stringers being locked to each other by interfitting portions formed thereon;

FIG. 4 is a perspective view, partly sectionalized, of a building wall wherein intermediate and juxtaposed edge stringers on facing rows of panel units are interlocked by dual-tenon splines in their opposite relationship, and each two edge stringers are locked to each other by a tongue-and-groove engagement with the same splines.

FIG. 5 shows a portion of a structure such as the one in FIG. 4, the groove in the splines in this instance, and the tongues on the juxtaposed edge stringers that fit into it, have a profile of a dovetail mortise and of two half-tenons, respectively.

FIGS. 6 to 8 show profile views of unions between juxtaposed edge stringers and intermediate stringers opposite thereto, the single spline in each case having either convexly or concavely curved flanks, and the tongue-and-groove instrumentalities on the splines for lateral interlock of the edge stringers being also arcuate.

FIG. 9 is a union of juxtaposed edge stringers and of an intermediate stringer, all of sheet material, by means of a spline consisting of two oval shapes slotted lengthwise in their outer faces for receiving tongues of both stringers and thereby locking them and their panels into unity.

FIGS. 10 and 11 are plan views of building walls with juxtaposed stringers and intermediate stringers in various combinations forming L- T-intersections therein; the panel units in FIG. 10 are continuous around corners, those in FIG. 11 meet at corner parting lines;

FIG. 12 is an end view of a pair of juxtaposed stringers interfitted with a grooved dual tenon spline and having a locked hold thereon jointly with the proximate end of a structural member which may be a stringer or any other kind of stress member;

FIG. 13 shows a stress member such as a beam interjacent two panel unit rows and united therewith by juxtaposed stringers and intermediate stringers of which the former ones are held against lateral separation by having a tongue-and-groove interfit with the stress member; one of the juxtaposed stringers is shown disassembled from the union;

FIG. 14 is a building wall which differs from the one in FIG. 4 in that individual studs intervene between the spaced rows of panel units and the stringers thereon and are interlocked therewith by dual-tenon splines; the edge stringers are locked against separation by being straddled by tongues on the studs;

FIG. 15 is a profile view of a structural union of one intermediate stringer and juxtaposed stringers with an interjacent stud or beam by means of an individual spline for each juxtaposed stringer and two splines for the intermediate one;

FIG. 16 shows stringers and splines analogous to those of FIG. 9, the stringers in this instance being oppositely alined and interlocked with a stress member, such as a beam or stud, and the juxtaposed stringers with each other, by means of a slotted hollow spline;

FIG. 17 is an end view of a structural union substantially like the one in FIG. 15, i.e., each stringer is locked to an associated structural member—a box beam in this instance—by a spline or splines, the beam left of the center line having a round section, and a rectangular one right of the center line;

FIG. 18 is an end view of a structural union of the same type as in FIGS. 15 and 17, except in that the associated structural member to the stringers therein is an H-beam;

FIG. 19 shows a union of panel units and stringers thereon with an interjacent I-beam, the interlocking splines having an hourglass cross-section;

FIG. 20 is a panel structure wherein a diagonal truss is the associated structural member to juxtaposed stringers and intermediate stringers, each two truss extremities proximate to each other and to a panel unit are interlocked with each other by one spline and with a stringer or stringers by another one, and lock each two juxtaposed stringers together by straddling them;

FIG. 21 is an end view of an airplane wing and an aileron or flap hinged thereto; both the wing and the aileron or flap body including spaced panel units and interjacent chordwise bulkheads held in unity therewith by spanwise juxtaposed stringers and oppositely alined intermediate stringers into which are dovetailed interlocking splines.

The structure of FIG. 1, similarly as all the other embodiments in the drawings, includes a number of panel units 1–2 and 3–4 in spaced apart facing rows; each panel unit has on its inner face a number of wall means which in this case are in the form of stringers of two types, i.e., stringers such as 5 extending in juxtaposition to a stringer 6 on an adjoining panel unit at and along the panel unit edge and hereinafter referred to as the "edge" stringer; and stringers such as 7 which extend on the panel units at intervals apart from the edge stringers, and hereinafter are referred to as "intermediate" stringers. The intermediate stringers, such as 7 and 8, on the facing panel units 1 and 3, are both alike and are in opposite alinement and contiguity with each other at frontal faces; they are characterized by a profile consisting of an attaching flange 9 and a web or wall 10 standing thereon and supporting a head with a frontal face and two coplanar shoulders such as 11 thereon, and between the shoulders having a lengthwise mortise; the profile of this mortise may assume any reentrant shape, such as a dovetail one as shown, the principal feature being the inwardly divergent directions of its sides towards a bottom which in this instance is flat. In the assembled relationship, the stringers 7 and 8 confront and contact each other with their shoulders 12 and 11, respectively, and their mortises fall into registry with each other, and into them is slid endwise a spline 13. In profile this spline conforms substantially to the two combined stringer mortises in that it consists of two tenons with convergently tapering sides, in this instance of dovetail shape, siamesed at their narrowest width.

The tapering sides of the spline may be made further use of to render the union of the stringers rigid by causing them to enter the mortises with an interference fit whereby their wedged engagement with the stringers will urge the latter to abut at their shoulders 11–12 and thereby eliminate all lash from their contact with the spline as well as with each other and, furthermore, increase their lateral stability due to such a shoulder-against-shoulder abutment.

The edge stringers 5–6 and 14–15 are all alike in profile which is characterized by an attaching flange 16, a wall 17 standing thereon and supporting an extremity with one shoulder 18 thereon away from the panel unit parting line plane, and between this shoulder and that plane bearing one half of a mortise such as characterizes each one of the intermediate stringers 7 and 8, with the reentrant side under the shoulder 18 and the open side at the parting plane; when two such edge stringers, such as 5 and 6 on adjoining panel units 1 and 2, respectively, fall into juxtaposition, their extremities provide a frontal face with two coplanar shoulders astride the parting plane, and their half-mortises combine to form a single mortise with two reentrant flanks, in which manner these edge stringers represent a full equivalent of one intermediate stringer, such as 7 or 8, and are capable jointly of engaging one tenon of a spline 19 slid into them. This feature of twin edge stringers being competent to function as and take the place of one intermediate stringer is of fundamental significance in that it makes it feasible to oppositely aline either edge stringers with one another on spaced facing panel units at coinciding parting lines therein, or to aline edge stringers with an intermediate stringer on such panel units and thereby obtain either coincident or non-coincident relationships of the parting lines therein.

To prevent the edge stringers and their panel units from separating at a parting line, the edge stringers are locked either to each other or to the associated structural member—if only one is used in opposition to them; in the first case, as shown in this figure, a longitudinal mortise with reentrant flanks runs in the stringer wall 17 at and along the parting plane and open towards it, of a size identical with that of the mortise in the intermediate and combined edge stringer frontal extremity; this mortise in each one of the juxtaposed edge stringers falls into registry with a like mortise in the other one, and a spline 20 is slid into an engagement with both of them and draws the edge stringers, such as 5–6, together side-to-side in the same manner as the spline 13 causes the stringers 7–8 to become contiguous or even to abut shoulder-against-shoulder.

In the embodiment of FIG. 2 facing rows of panel units 21 and 22–23 include intermediate stringers such as 24, and edge stringers such as 25–26; the stringers are of a channel section with each side wall formed on its extremity face with two coplanar shoulders and a mortise therebetween, there thus being two mortises in each intermediate stringer in the frontal direction; the profile of these mortises is bulbous with reentrant sides and an arcuate bottom. The juxtaposed edge stringers 25–26 jointly amount to the intermediate stringer 24 bisected by the panel parting place; in order to conjoin such edge stringers side-by-side, they are formed with a bead 27 at and along the parting plane and in it runs lengthwise a mortise open laterally and having the same bulbous shape as the one in the stringer frontal extremity; the shoulder on the opposedly alined stringers 24–25 and 24–26 as well as on the juxtaposed stringers 25–26 come into contiguity with each other as splines 28 to 30, respectively, are slid endwise into their mortises in registry with each other.

A feature of importance in most applications resides in that the lateral faces of the edge stringers 25–26 are grooved longitudinally at the panel parting line, and a weather strip 31 is lodged therebetween and seals the seam between them by virtue of being compressed by the locked engagement of the spline 30 with the stringers; the location of this strip may be either over the panel edges or in proximity thereof.

The embodiment of FIG. 3 represents another species of the lateral interlock for the stringers in juxtaposition; facing and adjoining panel units 32 and 33–34 are provided with respective intermediate and edge stringers 35 and 36–37; the profile of the stringer 35 is known as the "hat" shape, and consists of coplaner attaching flanges such as 38, parallel upright walls such as 39, and a cross-web 40 in the outer face of which apart form its corners run lengthwise two dovetail mortises, each one in a slidable engagement with a spline such as 41. The edge stringers 36–37 jointly constitute a full equivalent of the intermediate stringer 35 and are each locked thereto by one of the splines; to that end, each edge stringer has a frontal face on a cross-web with one longitudinal mortise therein, and supporting walls 42 and 43 based upon an attaching flange 44. While the individual splines 41 in engagement with the stringer 35 lock both edge stringers 36–37 together, other means is provided for that purpose in the event when these stringers are oppositely alined and interlocked by the same splines with two edge stringers on facing panel units; to this end, each edge stringer is formed with a lengthwise tongue 45 on its lateral face, the tongue projectiing laterally and outwardly over the parting plane and over a groove that runs in the wall 43 next to it; the teeth on both edge stringers interfit with the grooves therein, and become inseparable in the presence of the splines 41 and a member, such as the stringer 39, or members interlocked therewith. A sealing strip 46 is contained in recesses in the edge stringers over the panel parting line, and is compressed therein by the lateral interlock for the stringers.

"Hat" type stringers similar to those of FIG. 3 with certain distinct features embodied therein characterize panel units 47–48–49 and 50–51–52 in the building wall of FIG. 4; on the inner face of each panel unit, such as 48, extend edge stringers 53 and 54, and at intervals apart therefrom intermediate stringers 55 and 56; both of these types are shown, by way of an example, as having for their opposite one of their own kind, i.e., juxtaposed edge stringers, such as 53–57, on adjoining panel units 48–47 in one row are in opposite alinement with juxtaposed edge stringers 58–59 on adjoining panel units in the facing row, and so are the intermediate stringers 55 and 56 oppositely alined with their counterparts 60 and 61, respectively; any random alinement of the stringers on the facing rows is, of course, feasible—such as of two edge stringers with an intermediate one—according to the hereinabove disclosed principle of stringer equivalency.

In distinction to the stringers in FIG. 3, those in FIG. 4 are interlocked by only one spline in the manner of those of FIG. 1; thus the intermediate stringers such as 55–60 have a joint hold on a spline 62 by means of a mortise of dovetail shape that runs in each one of them over a cross-web 63 between two coplaner shoulders. An identical spline 64 interlocks each two juxtaposed stringers such as 53–57 with their opposites, in this case juxtaposed stringers 58–59, by virtue of each edge stringer being formed with a half-mortise in a cross-web 67 and next to a shoulder 68 on a side wall 69; the distinguishing feature in this embodiment resides in that the same spline 64 is made use of to effect a juncture of the juxtaposed stringers in the lateral directions; this principle is carried out structurally by making each edge stringer engage the spline in both lateral directions, and for that purpose they are each formed with a longitudinal tooth or tenon 70 of a stub shape and located inside the half-mortise therein as a terminus of a side wall 71 adjoining the panel unit parting plane; the teeth 70 and 72 of each two juxtaposed stringers such as 53–57, respectively, interfit with and are engaged laterally by the spline 64, for which purpose the spline is provided with a lengthwise groove or mortise 73 in each of its opposite faces.

A spline so grooved is capable of conjoining as many as four stringers in a cluster by locking them in pairs shoulder-against-shoulder and side-to-side, as the stringers 53–58–57–59 are locked by the spline 64, thereby integrating into unity panel units in adjoining as well as facing relationship; a weather strip 74 between each two juxtaposed stringers at the panel parting line is compressed therein by their lateral engagement with the spline.

The assembly of a structure of this type is carried out, as an example, by erecting one row of panel units 47 to 49 first on a sill 75, which is anchored to a foundation 76 in the usual way, and securing these panel units to this sill by brackets 77 and bolts 78; the facing row of panel units 50 to 52 is then set up in position on the sill, and the splines are telescoped into the stringer mortises alined in registry with one another.

The structure of FIG. 5, including panel units 79–80 and 81–82 with intermediate stringers such as 83 and edge stringers such as 84–85 thereon, is held in unity by splines 86 of the dual tenon prismatic shape as all the foregoing structures herein; the distinguishing feature in this embodiment resides again in that the splines are grooved in their faces, the grooves having the profile of dovetail mortises with reentrant flanks 87; similarly, the tenons on the edge stringers that interfit with these mortises have their inner flanks slanted inwardly so that two such tenons on adjoining edge stringers, such as 88–89, jointly constitute a dovetail tenon complementary to the mortise in the spline 86. The significance of this dovetail shape lies in that a wedged interfit can be obtained between the spline and both stringers in order to secure them firmly to each other in the same manner as oppositely alined stringers can be drawn shoulder-against-shoulder by the same spline as disclosed with reference to FIG. 1.

The profile of the tenons that constitute a spline, and that of the grooves therein for the lateral interlock, is not limited to the dovetail shape, as already demonstrated in FIGS. 2 and 5, and further modifications are in evidence in FIGS. 6 to 9; the spline 91 in FIG. 6 has convex tenon flanks and arcuate grooves in its faces; the spline 92 in FIG. 7 is defined by a profile including half-circular tenon flanks as well as grooves of the same shape; similarly, the spline 93 in FIG. 8 has a profile made up of half-circular flanks and grooves, and in addition has rounded corners on its tenons in which respect it is related to the spline of FIG. 2; this spline is distinctive in that it is tubular.

Another tubular spline 94 characterizes the union of stringers 95 and 96–97 in FIG. 9 on appertaining panel units 98 to 100 in an adjoining and facing relationship; this spline consists of two oval tenon portions conjoined back-to-back and having their outer faces slotted lengthwise. The stringers are formed of sheet material with mortises and half-mortises therein conforming to the spline tenons and having a slidable engagement therewith for shoulder-against-shoulder contiguity and abutment. For lateral interlock, each edge stringer is provided with a projection of its inner wall 101 beyond the bottom of the mortise therein, and the bottom itself is attached to this projection by a flange 102; a tooth is thus created next to the parting plane which, side-by-side with a like tooth on the juxtaposed stringer, interfits with the slot in the spline 94; stringers so held in unity exert pressure upon a seal strip 103 for sealing the panel parting line.

The preceding basic unions of panel units in adjoining and facing relationships by means of intermediate and edge types of stringers and dual tenon splines are useful for constructing walls and the like of any extent, size and shape; by modifications of the stringer shapes; panel units can be disposed and locked in any angular relationship in order to obtain L- and T-intersections in such walls; FIGS. 10 and 11 represent two such structures. In the former one, panel units 104 to 110 form straight rows as well as intersections therebetween, or are continuous both around inner and outer corners; intermediate stringers such as 111 and edge stringers such as 112–113 having profiles disclosed in the preceding figures are used as well as stringers 114–115 with frontally and laterally interlocked extremities thereon corresponding to those on the edge stringers 112–113 but with right-angle flanges 116 attached to the inner face of corner panel units 108 and 109, respectively; a spline 117 interlocks the stringers 111 and 114–115 into unity and thereby completes a T-intersection and, furthermore, jointly with the stringers thereat functions as a stress members or stud in the structure. Obviously, instead of the stringer 111 two other stringers analogous to 114–115 could be interlocked by the spline 117 to form a cross-intersection of four walls.

At an L-intersection in the same structure, one panel unit 106 furnishes an outer rounded corner and is in an edge-to-edge alinement, by means of juxtaposed stringers 112–113 and 120–121, with the respective adjoining panel units 105 and 107; a tubular stringer 122 on the inner panel unit 110 has two mortised extremities and coplanar shoulders on them in opposite alinement with shoulders and mortises of the two pairs of stringers 112–113 and 120–121, and is interlocked therewith by splines 123 and 124.

Five different shapes of stringers are made use of to assemble the structure of FIG. 11; panel units 125 to 134 therein meet at seams in coplanar as well as right-angle relationships and for that purpose are provided with intermediate stringers such as 135 of the profile shown previously in FIG. 4, and with edge stringers represented by four shapes 136 to 139. Of the latter stringers, 138 are duplicates of those in FIG. 4; stringers 136 differ therefrom in height and in the angularity of their attaching flange 140, whereby the stringers diagonally across a corner or L-intersection; stringers 137 are of complemental shape to 136 at the same intersection, occupying the outer corner; and stringers 139 are in a side-by-side relationship with edge stringers 138a and in a frontal alinement with an intermediate stringer 135a, for which purpose they are formed with two half-mortises and teeth therein in right-angle walls. Splines 141 with grooved outer faces effect the juncture of the stringers at the intersections and apart therefrom, and augment the stringer load carrying capacity at all locations. Sealing strips 142 between all juxtaposed edge stringers are held under compression by the stringer engagement with the splines 141.

In all of the foregoing embodiments, stringers on one row of panel units are in opposite alinement with associated structural members disposed along one side of the panel units, and such members are represented by stringers on a facing row of panel units, the stringers being interlocked by splines relatively immovably to constitute the necessary stress members in such structures. In other embodiments, individual stress members may be found preferable or necessary in association with the stringers on either one row of panel units, or interjacent two such rows, and such stress members are alined with the panel unit stringers and interlocked therewith by splines. The stringers as well as the members may be formed with proportions and certain features making them best suited for such application, and the remaining figures in the drawings show examples of such stringers and stress members.

The union in FIG. 12 represents stringers 145–146 low in height such as are best suited for association with an individual stress member 148 whose extremity is identical with that of an intermediate stringer in that it has a frontal face and in it a number, i.e., one or more of reentrant mortises 149 between two coplanar shoulders such as 150; this extremity, which may be that of a joist, stud, beam, spar, etc., is an engagement with one tenon of a dual tenon spline 147, while the edge stringers 145–146 each engage one half of the other spline tenon by means of a half-mortise formed in them between an outer shoulder and a tongue 152 next to the panel unit parting plane; the spline 147 is formed with a deep lengthwise fold 151 in one of its faces, and the confronting tongues 152 on the juxtaposed stringers 145–146 interfit with it in the same manner as the stringers in FIG. 4 for instance do. By thus becoming locked to the spline 147 individually, the edge strirngers and their appertaining panel units 143–144 are rendered inseparable from each other as well as from their associated structural member 148 in the presence of this spline and, furthermore, can be made to abut the member 148 shoulder-against-shoulder by making their engagement and that of the member with the spline a wedged fit. A sealing strip 153 is deposited in the fold 151 of the spline and is compressed therein by the stringer tongues 152.

In the specimen of the structure of FIG. 13, spaced panel units 154-155 and 156 are provided with respective edge stringers and intermediate stringers 157-158 and 159; in opposite alinement and interlocked therewith by splines 160 and 161 is a stress member 162; the profile of these splines is made up of two tenons with rounded ends and a parallel neck portion therebetween; the member 162 has a tubular body with a mortise running lengthwise in each profile extremity between two coplanar shoulders on a cross web 163, the width of the mortise opening between these shoulders being greater than the width of the neck in the splines 160 and 161. Each of the edge stringers 157-158 has a half-mortise in it underneath and laterally of a shoulder 164 on which runs, along the mortise edge, a tooth 165; in the assembly, this tooth enters into the stress member widened mortise opening and thus becomes locked thereto both in the lateral and frontal directions in the presence of the spline 160. A weather strip 166 is held under compression by and between the edge stringers and the spline 160.

The hollow wall structure of FIG. 14 differs from the preceding one mainly in a modified manner of locking the edge stringers therein to each other; it includes facing rows of panel units 167-168-169 and 170-171-172, each one of which includes edge stringers such as 173 and 174, and at intervals apart therefrom intermediate stringers 175 and 176; the latter have attaching flanges such as 177, and between and away from them two coplanar shoulders such as 178 alongside a mortise which undercuts them by its oblique flanks. Two juxtaposed edge stringers, such as 173-179, form a full equivalent of one intermediate stringer and are recessed from the panel unit parting plane in order to accommodate a sealing strip 180 thereat. Interjacent the stringers of both types on the facing panel unit rows are studs 181 to 184, all alike, in each of the opposite profile extremities of which runs lengthwise a dovetail mortise 185 between two coplanar ledges 186 and 187 with marginal teeth 188 and 189, respectively thereon as projections of the stud side walls. The studs are in contiguity of their ledges with the shoulders on the intermediate and on the juxtaposed edge stringers, their teeth 188 and 189 straddling the edge stringers and thereby locking them to each other laterally, and being locked therewith in the transverse direction by prismatic splines such as 190 that are telescoped into the stringer and stud mortises in registry one with another.

The erection of the wall of FIG. 14 is accomplished by first setting up to studs in their positions on a sill 191 without securing them permanently in place, next placing the panel units in position, and then telescoping the splines into the stud and stringer mortises; as the final step, the studs are tied down securely by means of foot brackets 192 and bolts 193 which are reached either by an extended socket wrench or by holding the panel units on one side from bottoming until after the bolts have been tightened.

Plural splines shown in FIGS. 2 and 3 as interlocking oppositely alined stringers can be made use of to hold two juxtaposed edge stringers against separation by locking them individually to a stress member such as the stud or beam 197 in FIG. 15; in this embodiment, edge stringers 195-196 are each formed with a frontal face and in it one whole mortise 198, which by way of an example is of a bulbous shape; an individual spline 199 interfits with it as it does with the member 197, the latter being formed with two lengthwise mortises in a frontal face and shoulders one each of its profile extremities. An identical extremity with two mortises therein characterizes each intermediate stringer 194, which is interlocked face-to-face with the member 197 by splines 200 and 201. The edge stringers 195-196 compress a sealing strip 202 between them by their engagement with the splines 199 and their interlocked union with the member 197.

Another species, previously disclosed herein in connection with FIG. 9, of holding edge stringers in unity by a slotted spline, is shown in FIG. 16 wherein a stress member such as a beam 203 is the associated one to edge stringers 204-205 and to an intermediate stringer 206. The stringers 204-205 are characterized each by a half-mortise formed between and below a frontal shoulder and the parting plane, and adjoining this plane are formed with a tooth 207 so that the teeth of both stringers abut flank-to-flank, and both enter into a slot which runs lengthwise in a spline 208, and thus become inseparable in its presence. The beam 203 is made up of rolled shapes which meet flange-to-flange inside mortises which run between shoulders on both profile extremities of the beam, similarly as the edge stringers meet each other, and are preferably joined to each other thereat and enter together into the slotted spline 208 which interfits with one extremity of the beam, and into a spline 209 inside the other extremity.

The next three FIGS. 17 to 19 represent each a different geometrical shape of a stress member and intermediate as well as edge type stringers oppositely alined and locked into unity with it by splines. In FIG. 17, a tubular stress member 210 of a round section is shown on the left side of the center line, and of a rectangular section 210a on the right side, in association with stringers of a channel shape; the intermediate stringer 211, and the edge stringers 212-213 have their prototypes in stringers 24 and 25-26, respectively, of FIG. 2 with a modifying feature in that lateral attaching flanges are added thereto. In distinction to the embodiment of FIG. 2, however, instead of being locked to each other by one spline across the parting plane, the edge stringers 212-213 are interlocked through the medium of the stress member 210, or 210a, in that they each have a joint hold therewith on one spline, 214 and 215, respectively.

The stress member 216 in FIG. 18 is an H-beam, and its manner of integration with an intermediate stringer 217, and with edge stringers 218-219, by means of splines such as 220, is identical with that of the tubular member 210 of FIG. 17.

In an I-beam 221, shown in FIG. 19, each profile extremity is provided with a longitudinal mortise between two ledges and marginal teeth 222 and 223 thereon, as disclosed first in connection with the stress members 181 to 184 of FIG. 14; in an interlocked assembly with intermediate stringers such as 224 and twin edge stringers such as 225-226, by means of splines such as 227, the beam teeth 222 and 223 straddle shoulders on the edge stringers and thereby lock them and their panel units to one another. A sealing strip 224 is lodged over the panel unit parting line in a grooved outer face of the spline 227 and is compressed by the lateral engagement of the stringers 225-226 with the member 221 and by their hold on the spline 227.

A type of structure often favored for roofs and floors is the diagonal truss; in the one shown in FIG. 20, a number of stress members or lattices 228 to 230 are placed with their proximate ends at opposite rows of panel units 231 and 232-233 in opposed alinement with intermediate stringers such as 234 and edge stringers such as 235-236 thereon. The lattices are interlocked with one another by splines such as 237 which interfit with lateral mortises in each one of them, thereby becoming virtually a unitary truss; a divided mortise 238 runs in each two proximate lattices frontal extremity, and bordering it is a ledge 239 with a marginal lengthwise tooth 240 on it; when interlocked with the panel unit stringers by splines such as 241, each two proximate lattices straddle with their teeth 240 and 242 the stringer or stringers in a ledge-against shoulder contiguity with them, and by so doing lock all juxtaposed edge stringers, such as 235-236, into unity.

A structure which embodies both opposedly alined stringers such as shown in FIGS. 1 to 11 as the principal stress members, and individual stress members interjacent spaced facing panel units, is shown in FIG. 21; this structure is that of an airplane wing and its airfoil or flap; spaced facing panel units 243 and 244 in the wing, and 245 and 246 in the aileron, jointly form an airfoil shell; each panel unit is provided on its underside with an edge stringer 247 in the wing, and 251 in the aileron, and with intermediate stringers 248 to 250 in the wing, and 252 in the aileron; interjacent these panel units is a framework consisting of chordal bulkheads such as 253 in the wing, and 254 in the aileron, and spanwise stringers 255 to 258 at their fore extremity and on both top and bottom sides in the wing, and 259 and 260 in the aileron; these bulkhead stringers in their respective locations are in a shoulder-against-shoulder contact with one another and are interlocked by splines such as 261 with the juxtaposed edge and intermediate stringers 247 to 250 in the wing, and 251 and 252 in the aileron. In this configuration, the panel unit stringers and the bulkhead stringers as well as the splines therein constitute the principal stress members or spars subject to lift forces, while the bulkheads resist forces such as those on the aileron or flap that is hinged to them.

I claim:

1. In a structure, two panels meeting with each other at a parting line, a number of structural members extending at a distance from said panels along said parting line, said number of structural members having longitudinal reentrant mortises running therein and open toward said panels, juxtaposed stringers extending on said panels at and along said parting line and reaching to said number of structural members therefrom, said stringers having longitudinal reentrant mortises running therein in registry with said structural member mortises, dual tenon splines telescoped into engagement with said structural member and stringer mortises in registry, and laterally engaging means locking said juxtaposed stringers to each other against separation of said panels thereof at said parting line.

2. In a structure, two panels meeting with each other at a parting line, a number of structural members extending at a distance from said panels along said parting line, said number of structural members having longitudinal reentrant mortises running therein and open toward said panels, juxtaposed stringers extending on said panels at and along said parting line and reaching to said number of structural members therefrom, said stringers having longitudinal reentrant mortises running therein in registry with said structural member mortises and having longitudinal reentrant mortises running in the sides thereof in registry with each other, and dual tenon splines telescoped into engagement with said structural member and stringer mortises in registry and into said stringer mortises in registry.

3. In a structure, two panels meeting with each other at a parting line, a number of structural members extending at a distance from said panels along said parting line, said number of structural members having a longitudinal reentrant mortise running therein and open toward said panels, juxtaposed stringers extending on said panels at and along said parting line and therefrom reaching to said number of structural members, said stringers having each one half of a longitudinal reentrant mortise running frontally therein, laterally engaging means for locking said juxtaposed stringers to each other and causing them to combine said half-mortises therein into one mortise in registry with said structural member mortise, and a dual tenon spline telescoped into engagement with said structural member and stringer mortises in registry.

4. In a structure, a number of panel units meeting with one another at parting lines in two spaced facing rows, stringers extending on said panel units in juxtaposition to one another at and along said parting lines, intermediate stringers extending on said panel units at intervals apart from said parting lines, said stringers in juxtaposition and said intermediate stringers on said panel units in each row being in random opposite alinement with stringers in juxtaposition and with intermediate stringers on the facing row, said intermediate stringers bearing a number of longitudinal reentrant mortises open toward the facing panel unit row, said stringers in juxtaposition bearing each one half the number of longitudinal reentrant mortises as one of said intermediate stringers, said mortises in said opposedly alined stringers in juxtaposition and in said intermediate stringers being in registry with one another, dual tenon splines telescoped into engagement with said mortises in registry, and laterally engaging means locking said stringers in juxtaposition and said panel units against separation at said parting lines in the presence of said splines therein.

5. A structure including, a number of panel units meeting at parting lines in spaced facing rows and forming straight walls and L- and T-intersections therein, stringers extending on said panel units in juxtaposition to one another at and along said parting lines, stringers extending on said panel units at intervals apart from said parting lines, certain of said parting lines being located at said intersections and others in said straight walls, said stringers in juxtaposition and said intermediate stringers on each panel unit row being in random opposed alinement with stringers in juxtaposition and with intermediate stringers on a facing panel unit row and with stringers on two rows facing each other at said T-intersections, certain of said intermediate stringers at said intersections and apart therefrom bearing a number of longitudinal reentrant mortises open away from said panel units, others of said intermediate stringers and all of said stringers in juxtaposition bearing each one half the number of longitudinal reentrant mortises as one of said intermediate stringers, said mortises in said opposedly alined intermediate stringers and stringers in juxtaposition on facing rows of panel units and at said intersections being in registry with one another, dual tenon splines telescoped into engagement with said stringer mortises in registry, laterally engaging means for locking said stringers in juxtaposition to each other thereby holding said panel units together at said parting lines, and sealing strips confined between said stringers locked in juxtaposition at said panel unit parting lines.

6. In a structure, a panel; a structural member bearing coplanar corner extremities distanced from one face of said panel, a wall means standing on said panel face and therefrom reaching to said structural member and bearing corner extremities in contiguity with said structural member extremities, and a spline or splines in a slidably interlocked engagement with said structural member and with said wall means between said corner extremities thereof.

7. In a structure, a panel, a structural member bearing two shoulders coextensively with and distantly from one face of said panel and having at least one lengthwise mortise with undercut flanks between said shoulders, a stringer extending on said panel face and bearing two shoulders away therefrom in contiguity with said structural member shoulders and having at least one lengthwise mortise with undercut flanks between said shoulders and in registry with said structural member mortise, and a spline having undercut flanks telescoped into said structural member and stringer mortises in registry.

8. In a structure, a panel, a number of structural members coextensive at intervals with one another along one face of said panel, said members having each a profile extremity with marginal shoulders thereon distanced from said panel face and having a number of reentrant lengthwise mortises in said extremity, splines having dual reentrant tenons and being each in engagement of one of said tenons with one of said mortises, and stringers extending on said panel, said stringers reaching from said panel to and bearing a profile extremity with marginal shoulders thereon in contiguity with one of said structural member extremity shoulders and having a number of reentrant mortises in said extremity thereof in registry with a number of mortises in said structural member extremity and in engagement with the other one of said spline tenons.

9. In a structure, two panels meeting with each other at a parting line, at least one structural member having a face coextensive with and distanced from said parting line, stringers standing on said panels next to each other at a plane through said parting line and reaching to said structural member and bearing faces in contiguity with said face thereof, a spline having two tenons with undercut flanks and being in a slidable engagement of one tenon with both of staid stringer faces and in engagement of the other tenon with said structural member face, and means engaging said stringers laterally and locking them to each other in the presence of said spline therein.

10. In a structure, components and their relationships as set forth in claim 1, said means locking said stringers to each other residing in at least one of said spline tenons being grooved lenthgwise, and lengthwise tongues on said stringers fitted into said spline grooved tenon.

11. In a structure, components and their relationships as set forth in claim 1, said means locking said stringers to each other including complemental frontally interfitted and laterally engaged portions of said stringers and of said structural member along said spline therein.

12. In a structure, components and their relationships as set forth in claim 1, said means locking said stringers to each other including lengthwise tongues on said structural member along said spline, said tongues projecting beyond said member face and engaging said stringers laterally.

13. In a structure, components and their relationships as set forth in claim 1, said means locking said stringers to each other including lengthwise tongues on said stringers along said spline therein, said tongues projecting beyond said structural member face and engaging said structural member laterally.

14. In a structure, components and their relationships as set forth in claim 1, said means locking said stringers to each other including lengthwise complementally and interlockingly formed portions of said stringers in engagement with each other.

15. In a structure, components and their relationships as set forth in claim 1, said means locking said stringers to each other including a linear key, said key having two tenons with undercut flanks and being in engagement of each tenon with one of said stringers.

16. In a structure, components and their relationships as set forth in claim 1, said stringers having lengthwise recesses running therein in registry with each other at said parting line, and a sealing strip lodged in said recesses and compressed therein by said stringers and said locking means therefor.

17. In a structure, components and their relationships as set forth in claim 1, said panels meeting angularly with each other at said parting line, and said stringers' faces being borne at right angles to a plane through said panel parting line.

18. In a structure, two panels meeting with each other at a parting line, a third panel coextensive at a distance with said parting line, juxtaposed stringers extending on said two panels at said parting line and therefrom reaching towards said third panel, a stringer extending on said third panel and therefrom reaching into opposition with said juxtaposed stringers, said stringers in opposition having faces in contiguity with one another, a spline or splines in said faces thereof interlocking said stringers in opposition with one another, and laterally engaging means for locking said juxtaposed stringers with each other for holding said meeting panels together at said parting line.

19. In a structure, two panels meeting with each other at a parting line, two other panels meeting with each other at a parting line coextensive with and distanced from said first parting line, juxtaposed wall means extending on each two of said meeting panels at and along said parting line therein, said wall means reaching from said panels into opposition with one another and having frontal faces in contiguity with one another, a spline or splines in said faces interlocking said wall means in opposition with one another, and laterally engaging means for locking said juxtaposed wall means on each two of said panels to each other and thereby holding said meeting panels together at said parting line.

20. In a structure, components and their relationships as set forth in claim 19, said locking means for said juxtaposed wall means including dovetail mortises in the profile faces of one of said splines therein, and tenons on each two of said juxtaposed wall means dovetailed into one of said spline mortises.

21. In a structure, components and their relationships as set forth in claim 19, said locking means for said juxtaposed wall means including a spline in an interlocked engagement with each two of said wall means.

22. In a structure, two panels meeting with each other at a parting line, two other panels meeting with each other at a parting line coextensive with and distanced from said first parting line, a linear key or keys of the profile of dual reentrant tenons interjacent said pairs of meeting panels along said parting lines therein, a pair of justaposed stringers extending on each pair of said meeting panels, said stringers having each a wall standing next to a plane through said panel parting line and reaching to said key or keys and bearing a cross-web thereat, said juxtaposed stringer cross-webs complementing each other in forming two coplanar shoulders astride said panel parting line plane and a mortise or mortises therebetween, said juxtaposed stringer shoulders on said stringer pairs being in contiguity with one another and said mortise or mortises therebetween engaging said key tenons, and laterally engaging means for locking said juxtaposed stringers in each pair to each other and thereby holding each two of said meeting panels together at said parting line thereof.

23. In a structure, components and their relationships as set forth in claim 22, said panels in each of said pairs meeting angularly with each other, and said stringer cross-webs and shoulders thereon being at right angles to a plane connecting both of said parting lines.

24. In a structure, two panels facing each other at a distance to form a hollow body, stringers extending on said panels in spaced intervals and reaching into opposition with one another and bearing faces in contiguity with one another and having reentrant lengthwise mortises in said faces in registry with each other, and a dual tenon spline telescoped into each two of said mortises in registry for locking said stringers in said contiguity thereof.

25. In a structure, two panels facing each other at a distance to form a hollow wall, stringers extending on said panels in spaced intervals and reaching into opposition with one another, said stringers bearing shoulders in contiguity with one another and having reentrant lengthwise mortises between said shoulders in registery with each other and a dual tenon spline telescoped into each two of said mortises in registry.

26. In a structure, panels meeting with one another at parting lines, structural members coextensive with and distanced from one side of said panels, dual tenon splines interjacent said panels and members at said parting lines, dual tenon splines interjacent said panels and members at intervals apart from said parting lines said members reaching to said splines and bearing coplanar corner extremities therealong and having one or more reentrant mortises between said extremities in engagement each with one of said spline tenons, juxtaposed stringers extending on each two of said panels at said parting lines, and intermediate stringers extending on said panels at intervals apart from said parting lines, said intermediate stringers reaching to said splines apart from said parting lines and bearing corner extremities along said splines in contiguity with said structural member extremities and having one or more reentrant mortises therebetween in engagement each with the others of said spline tenons, said juxtaposed stringers forming jointly a divided equivalent of one of said intermediate stringers and of said corner extremities thereon and being in engagement of one or more of reentrant mortises between said corner extremities with the others of said spline tenons at said parting lines, and laterally engaging means for locking said juxtaposed stringers to each other.

27. In a structure, components and their relationships as set forth in claim 26, certain of said panels meeting coplanarly with each other at said parting lines, others of said panels meeting angularly with each other at said parting lines, said corner extremities on said stringers and members at said coplanarly meeting panels and apart therefrom being parallel with said panels, and said corner extremities on said stringers and members at said angularly meeting panel parting lines being at right angles to a plane through said parting lines.

28. In a structure, panels meeting with one another at parting lines in two rows distanced from each other, dual tenon splines interjacent said panel rows at and along said parting lines therein, wall means extending on said panels at and along said parting lines, said wall means reaching from said panels in both rows to said splines and bearing frontal faces in contiguity with one another and having reentrant mortises running lengthwise in said faces in engagement with said spline tenons, and lengthwise slidable means for locking said wall means on each two panels at a parting line to each other.

29. In a structure, components and their relationships as set forth in claim 28, dual tenon splines interjacent said panel rows at intervals apart from said parting lines, and wall means extending on said panels in both rows at intervals apart from said parting lines, said wall means reaching from said panels in both rows to said splines and bearing frontal faces in contiguity with one another and having reentrant mortises running lengthwise in said faces in engagement with said spline tenons.

30. In a structure, panels meeting in continuity with one another at parting lines in two rows distanced from each other, certain of said parting lines in both rows being coincident with each other and others being non-coincident, intermediate wall means extending on said panels at intervals apart from said parting lines and each bearing a cross-web between said panel rows and having a reentrant lengthwise mortise or mortises therein, juxtaposed wall means extending on said panels at and along said parting lines, said juxtaposed wall means constituting jointly a divided equivalent of one of said intermediate wall means cross-web and mortise or mortises therein, said intermediate wall means on both panel rows being in contiguity of said cross-web thereof with one another and in registry of said mortise or mortises therein at locations apart from said coincident and non-coincident parting lines, said intermediate wall means and said juxtaposed wall means on both panel rows being in contiguity of said cross-web thereof with one another and in registry of said mortise or mortises therein at said non-coincident parting lines, said juxtaposed wall means on both panel rows being in contiguity of said cross-web thereof with one another and in registry of said mortise or mortises therein at said coincident parting lines, laterally engaging means for locking said juxtaposed wall means on each two panels to each other, and a dual tenon spline telescoped into each two of said mortises in registry.

31. In a structure, panels in coplanar and angular relationships meeting with each other at parting lines to form an intersection between parallel and distanced rows of panels in hollow walls, a dual tenon spline or splines interjacent said panel rows at said intersection, juxtaposed stringers extending on each two of said meeting panels at said parting lines, each of said juxtaposed stringers reaching to said spline or splines and jointly with the other stringer bearing coplanar shoulders therealong, said juxtaposed stringers from all of said meeting panels being in contiguity of said shoulders thereof along said spline or splines at right angles to parting planes through said juxtaposed stringers and forming jointly a reentrant mortise or mortises in engagement with said spline tenons, and laterally engaging means on each two of said juxtaposed stringers for locking them to each other in the presence of said spline or splines therein.

32. In a structure, components and their relationships as set forth in claim 31, at least one of said panels being continuous through said intersection, an intermediate stringer extending on each of said continuous panels, said stringer reaching to said spline or splines and bearing coplanar shoulders therealong in contiguity with said juxtaposed stringer shoulders thereat and with shoulders on others of said intermediate stringers thereat and having a reentrant mortise or mortises in engagement with said spline tenons.

33. In a structure, panels in straight and angular parallel rows distanced from each other to form hollow walls and intersections therebetween, certain of said panels meeting coplanarly with each other at parting lines, others of said panels meeting angularly with each other at parting lines, said parting lines being in both coincident and non-coincident locations in rows forming each of said walls and intersections, dual tenon splines interjacent said panel rows in said walls and at said intersections at said parting lines therein and at intervals apart from said parting lines, intermediate stringers extending on said panels apart from said parting lines, said stringers reaching to said splines thereat and bearing shoulders therealong and having mortises therebetween in engagement each with one of said spline tenons, juxtaposed stringers extending on said meeting panels at said parting line therein, said juxtaposed stringers reaching to said splines thereat and bearing jointly a divided equivalent of said intermediate stringer shoulders along said splines and mortises therebetween in engagement each with one of said spline tenons, laterally engaging means for locking each two of said juxtaposed stringers to each other, said intermediate stringers being in contiguity with one another at said shoulders thereof along said splines apart from said parting lines and in a mortise-and-tenon engagement therewith, others of said intermediate stringers being in contiguity with said juxtaposed stringers at said shoulders thereof along said splines at said non-coincident parting lines and in a mortise-and-tenon engagement therewith, and others of said juxtaposed stringers being in contiguity with one another at said shoulders thereof along said splines at said coincident parting lines and in a mortise-and-tenon engagement therewith.

34. In a structure, two panels in a spaced apart relationship of each other, a structural member interjacent said panels and having profile extremities distanced therefrom, stringers extending on said panels and reaching to said srtuctural member extremities, said stringers and said structural member extremities bearing shoulders in contiguity with each other and between said shoulders having a reentrant lengthwise mortise or mortises in registry with each other, and a dual tenon spline telescoped into each two of said mortises in registry for interlocking said stringers in said contiguity with said member.

35. In a structure, two panels meeting with each other at a parting line, two other panels meeting with each other at a parting line coextensive at a distance with said first parting line, a structural member interjacent said panels and having profile extremities distanced therefrom at and along said parting lines, juxtaposed stringers extending on each two of said meeting panels at and along said parting lines and reaching to one of said structural member extremities, said extremities and said stringers bearing shoulders in contiguity with each other and between said shoulders having a reentrant lengthwise mortise or mortises in registry with each other, said stringers having each one half of said mortise or mortises therein, dual tenon splines telescoped one into each two mortises in registry for interlocking said stringers in said contiguity with said member, and means for locking each two of said stringers in said juxtaposed relationship thereof through the instrumentality of at least one of said splines and thereby holding said meeting panels together at said parting lines.

36. In a structure, panels in two spaced apart rows forming a hollow wall and meeting with each other at parting lines, structural members interjacent said panel rows at and along said parting lines therein, structural members interjacent said panel rows at intervals apart from said parting lines, said structural members having substantially identical profile extremities distanced from said panels, each of said extremities bearing shoulders and a reentrant lengthwise mortise or mortises therebetween, intermediate stringers extending on said panels at intervals apart from said parting lines and bearing shoulders in contiguity with said structural member shoulders and having a reentrant mortise in registry with each of said mortise or mortises between said member shoulders, juxtaposed stringers extending on said meeting panels at and along said parting lines and each two stringers reaching to one of said structural member extremities and bearing each a shoulder in contiguity with one of said structural member shoulders and having each one half of said mortise or mortises in said extremity in registry therewith, each two of said juxtaposed stringers forming an equivalent of said shoulders and of said mortise or mortises therebetween on one of said intermediate stringers for random coincident and non-coincident occurrence of said parting lines in both panel rows and at anyone of said structural members, dual tenon splines telescoped one into each two of said mortises in registry for interlocking said stringers in said contiguity with said members, and means for locking each two of said stringers in said juxtaposed relationship thereof through the instrumentality of at least one of said splines and thereby holding said meeting panels together at said parting lines.

References Cited by the Examiner

UNITED STATES PATENTS

| | | | |
|---|---|---|---|
| 650,919 | 6/00 | Vordtriede | 72—107 |
| 1,697,070 | 1/29 | Knight | 72—107 |
| 2,164,138 | 6/39 | London | 72—16 |
| 2,287,229 | 6/42 | Carpenter | 20—92 |
| 2,363,405 | 11/44 | Eichelberger | 20—92 |
| 2,369,373 | 2/45 | Sheldon | 189—34 |

FOREIGN PATENTS

| | | |
|---|---|---|
| 524,688 | 9/21 | France. |
| 466,495 | 10/51 | Italy. |

JACOB L. NACKENOFF, *Primary Examiner.*

WILLIAM I. MUSHAKE, C. D. ANGEL, *Examiners.*